US006757712B1

(12) United States Patent
Bastian et al.

(10) Patent No.: US 6,757,712 B1
(45) Date of Patent: Jun. 29, 2004

(54) COMMUNICATIONS SYSTEMS FOR AIRCRAFT

(75) Inventors: Fabio Bastian, Seattle, WA (US); Peter W. Lemme, Kirkland, WA (US); Simon Gresham, Kirkland, WA (US); Philip Seik Poon Chan, Seattle, WA (US)

(73) Assignee: Tenzing Communications, Inc., Seattle, WA (US)

( * ) Notice: Subject to any disclaimer, the term of this patent is extended or adjusted under 35 U.S.C. 154(b) by 0 days.

(21) Appl. No.: 09/487,752

(22) Filed: Jan. 19, 2000

Related U.S. Application Data

(63) Continuation of application No. PCT/AU99/00737, filed on Sep. 8, 1999.

(30) Foreign Application Priority Data

Sep. 8, 1998 (GB) .............................................. 9819587
Apr. 28, 1999 (GB) .............................................. 9909825

(51) Int. Cl.[7] .............................................. G06F 13/00
(52) U.S. Cl. ...................... 709/206; 709/236; 709/234; 709/232; 709/230; 709/203; 709/249; 709/221
(58) Field of Search ................................ 709/206, 203, 709/230, 231, 232, 234, 236, 221, 249

(56) References Cited

U.S. PATENT DOCUMENTS

| 5,717,878 A | 2/1998 | Sannino ...................... 725/117 |
| 5,974,444 A | 10/1999 | Konrad ....................... 709/203 |

(List continued on next page.)

FOREIGN PATENT DOCUMENTS

| EP | 0 277 014 A2 | 8/1988 |
| EP | 0 789 502 A2 | 8/1997 |

(List continued on next page.)

OTHER PUBLICATIONS

The Network Vehicle—A Glimpse into the Future of Mobile Multi–Media; R. Lind et al.; Proceedings of the 17th DASC (Digital Avionics Systems Conference, 1998); Oct. 31–Nov. 7, 1998.*

(List continued on next page.)

*Primary Examiner*—Kenneth R. Coulter
(74) *Attorney, Agent, or Firm*—Davis Wright Tremaine LLP; Michael J. Donohue

(57) ABSTRACT

A system for permitting passengers on board an aircraft to send and receive electronic data is described. The components of the system on board the aircraft include a server having a plurality of nodes to which computer terminals are attached, as desired. The computer terminals are laptop or palm-top personal computers belonging to the various passengers on board or fixed terminals within the aircraft. The server communicates with a wide variety of different terminals running different operating systems. Each computer terminal is connected to the server via an aircraft network. Server has mass storage which contains a database of WWW pages which can be browsed by passengers using terminals. Server provides a domain name server (DNS) that masquerades as the passenger's usual DNS. Server then links the passenger to the appropriate locally stored WWW page. Server also contains storage for e-mail messages. Connected to the server is one or more radios. This permits data to be transferred to base station using communications network. A virtual private network (VPN) connects station to communications service provider networks, web content processor, and via links to the Internet, including access to subscriber ISPs/corporate mail servers and other mail servers. Points of Presence (POP) provide Internet access and e-mail service to subscribers of the service while not on the aircraft. POPs can also be used by communications service provider networks and web content processors as an alternate means to connect to VPN.

43 Claims, 9 Drawing Sheets

U.S. PATENT DOCUMENTS

| | | | | |
|---|---|---|---|---|
| 6,047,165 | A | * | 4/2000 | Wright et al. .................. 455/66 |
| 6,201,797 | B1 | | 3/2001 | Leuca et al. |
| 6,249,913 | B1 | * | 6/2001 | Galipeau et al. ............... 725/76 |
| 6,449,287 | B1 | * | 9/2002 | Leuca et al. ................. 370/468 |
| 6,477,152 | B1 | * | 11/2002 | Hiett .......................... 370/316 |
| 6,499,027 | B1 | * | 12/2002 | Weinberger .................... 707/4 |
| 6,529,706 | B1 | * | 3/2003 | Mitchell .................... 455/12.1 |
| 6,643,510 | B2 | * | 11/2003 | Taylor ......................... 455/431 |
| 2001/0036822 | A1 | * | 11/2001 | Mead et al. ................ 455/414 |

FOREIGN PATENT DOCUMENTS

| | | |
|---|---|---|
| EP | 0 837 567 A2 | 4/1998 |
| EP | 0 890 907 A1 | 1/1999 |
| EP | 1 041 392 A1 | 10/2000 |
| EP | 1 096 699 A2 | 5/2001 |
| GB | 2 317 074 A | 3/1998 |
| GB | 2 324 395 | 10/1998 |
| GB | 2 347 586 A | 9/2000 |
| WO | WO 95/12853 | 5/1995 |
| WO | WO 96/02093 | 1/1996 |
| WO | WO 96/02094 | 1/1996 |
| WO | WO 98/26521 | 6/1998 |
| WO | WO 99/23807 | 5/1999 |
| WO | WO 99/31822 * | 6/1999 |
| WO | WO 00/14987 | 3/2000 |
| WO | WO 01/77877 A2 | 10/2001 |

OTHER PUBLICATIONS

Take Off, Plug In, Dial Up: Coming to a plane near you: e–mail, Web surfing, cell phones, and more; IEEE Spectrum; pp. 53–59; Sep. 2001.*

In–Flight Entertainment: The Sky's the Limit; Gerald Lui–Kwan; Computer; pp. 98–101; Oct. 2000.*

777 Optical LAN Technology Review; 48th IEEE Electronic Components and Technology Conference; pp. 386–390; May 25–28, 1998.*

O'Meara, Michael O. and Nelson, Eric, "A New Approach to Data Communications Utilizing the North American Terrestrial System", AT&T Wireless Services ACS, Seattle, WA, believed to have been released Nov. 2–6, 1998, pp. 1–8.

* cited by examiner

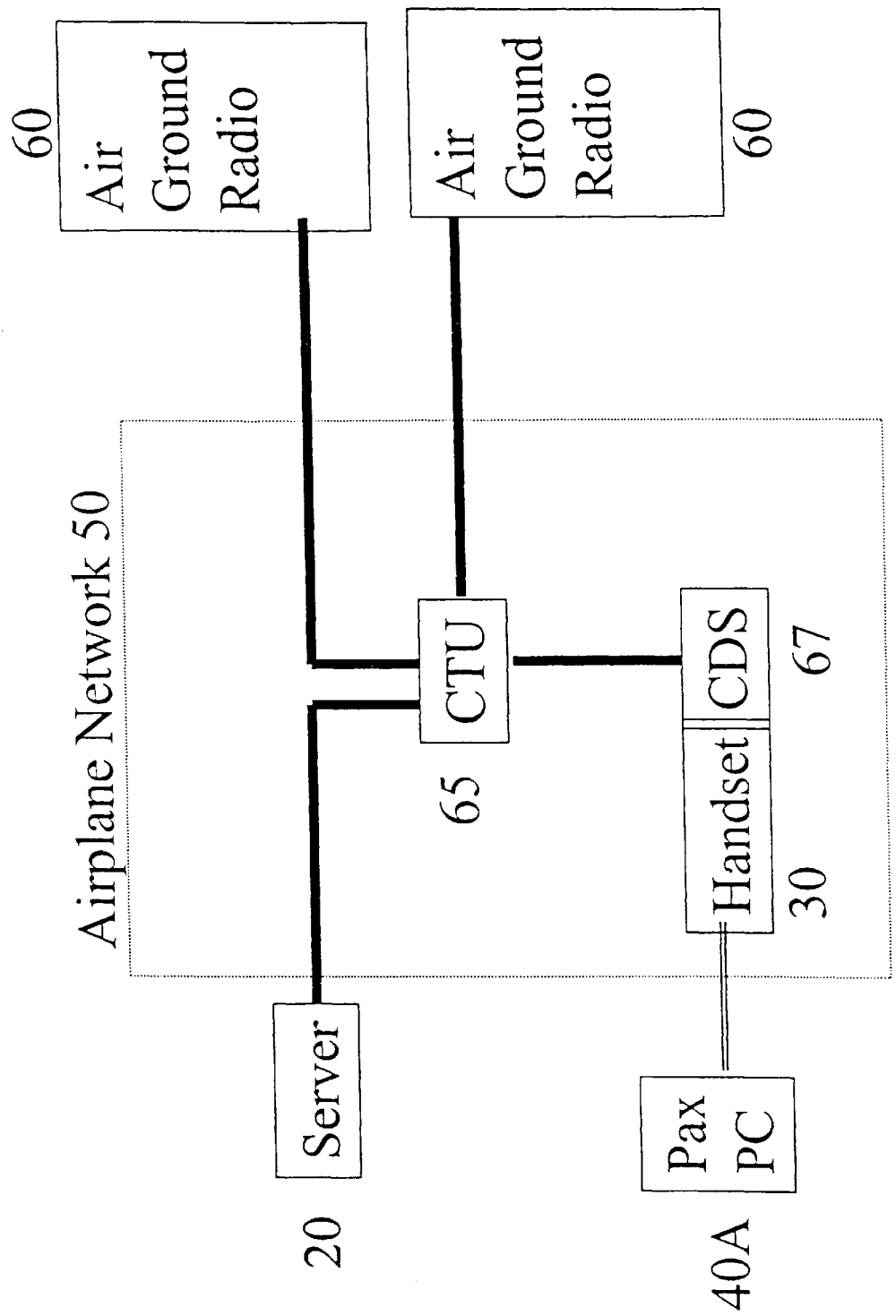
Figure 7 - Modem Airplane Network

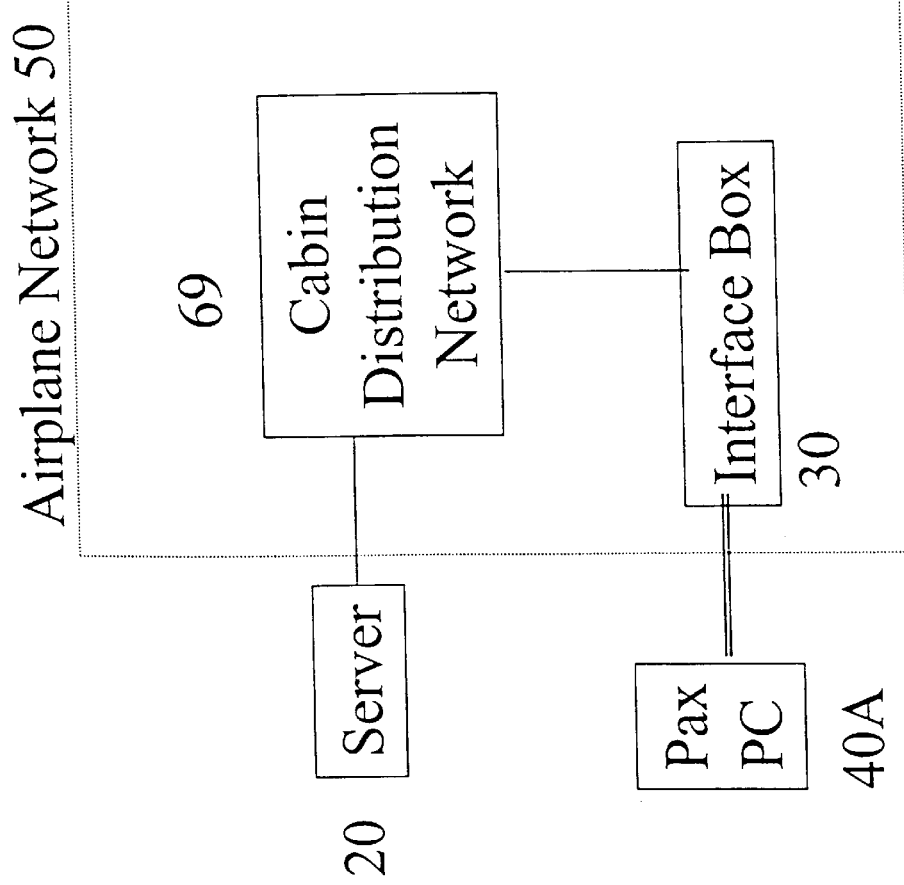
Figure 8 - RS232, USB, IEEE 1394 Airplane Network

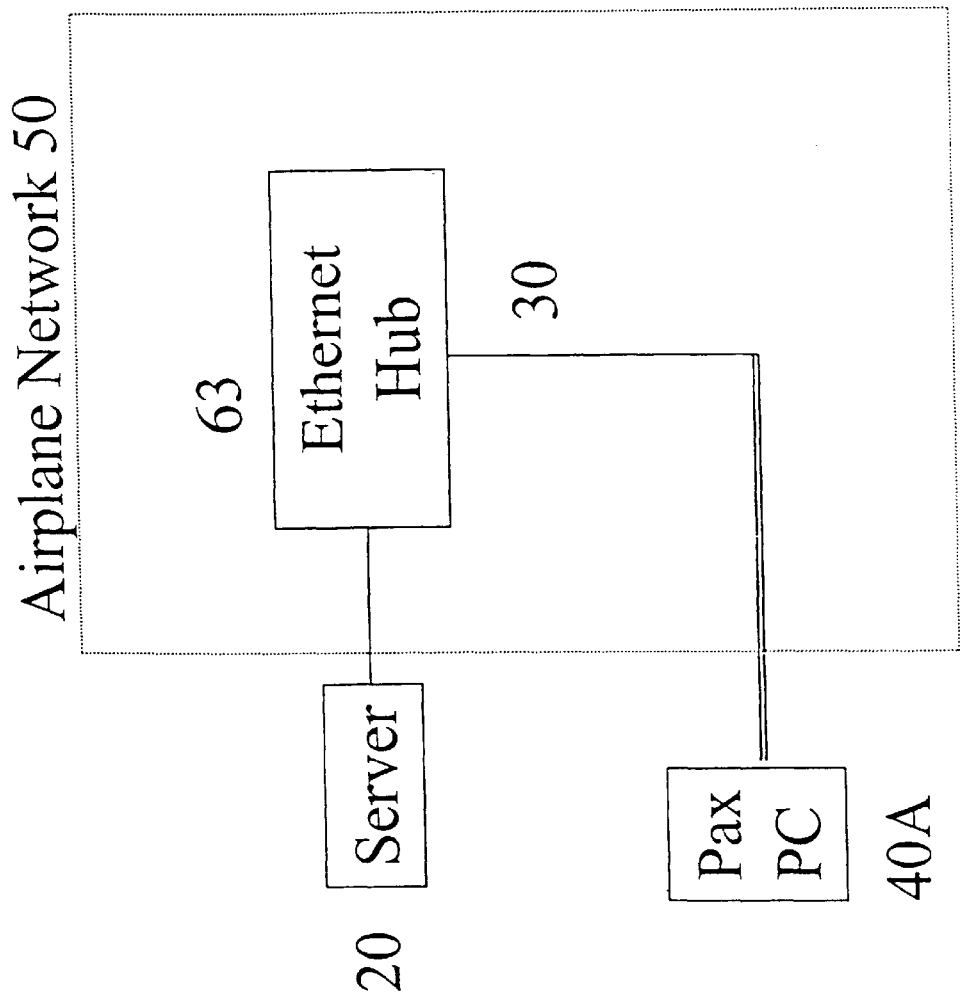
Figure 9 - Ethernet Airplane Network

COMMUNICATIONS SYSTEMS FOR AIRCRAFT

CROSS REFERENCE TO RELATED APPLICATIONS

This application is a continuation of pct application number PCT/AU99/00737, filed Sep. 8, 1999, which application claims priority from UK patent application number 9819587.8, filed Sep. 8, 1998 and UK patent application number 9909825.3, filed Apr. 28, 1999.

TECHNICAL FIELD

The present invention relates to a communication system for aircraft and in particular to a system for transmitting electronic data between an aircraft and a terrestrial base station.

The invention has been developed primarily for use with passenger aircraft and will be described hereinafter with reference to that application. However, it will be appreciated that the invention is not limited to that particular field of use.

BACKGROUND OF THE INVENTION

In recent times, portable computers such as "laptop" PCs and devices such as the Apple® Newton or other palm-held devices (PDAs) running Microsoft® Windows CE, for example, have become available. There have been commensurate improvements in mobile or cellular telephone technology and in protocols for transmitting computer-generated data across cellular networks. By employing a PCMCIA modem, for example, which allows data to be transferred between the laptop or PDA and mobile telephone, these twin developments have allowed e-mail messages and other electronic data to be sent and received by an individual at one of many locations, without the need to connect via a fixed land telephone line.

Several communications networks for providing telecommunications to airborne users are also known. For example, the North American Telephone System (NATS), including providers such as AT&T and Airfone, have installed terminals in many commercial aircraft to allow passengers to connect a laptop or PDA and transfer data from the passenger's seat.

In addition to terrestrial based aeronautical communications, satellite service providers such as Inmarsat provide airborne passengers communications from virtually any global location. Similar services are also offered by Iridium, who has launched another network of satellites. Furthermore, other satellite providers have or are launching constellations of satellites with the intention of providing airborne passenger communications.

One serious drawback of existing aeronautical passenger communications is the expense. In most cases, the passenger connects the laptop or PDA to a seat mounted handset using an integrated RJ11 jack. The passenger must make a modem connection to their ground based access server, provide authentication information, and then retrieve or send data. This process is generally technically challenging and unreliable. Even for the transfer of small amounts of data, one or more calls of one or more minutes is necessary. Furthermore, the existing speed of transmission, defined as bits per second (bps), is relatively slow—for example, the INMARSAT satellite services currently limit the data rate for passenger modem communications to 2400 bps. Thus, the time taken to transfer large amounts of electronic data, and the consequent expense, can become prohibitive.

In addition, the reliability of connection when employing a wireless link has been perceived as a major drawback during transmission of data in this way.

Thus, until now, the use of portable computers on aircraft, for sending and receiving electronic mail and browsing World Wide Web (WWW) sites has not been deemed feasible.

SUMMARY OF THE INVENTION

It is an object of the present invention to overcome or substantially ameliorate one or more of the disadvantages of the prior art, or at least to provide a useful alternative.

According to a first aspect of the invention there is provided a system for transmitting electronic data between a computer terminal on an aircraft and a terrestrial base station, the system including:

a server mounted upon or within the aircraft for communicating with the computer terminal wherein the terminal is disposed remotely from the server; and a terrestrial base station for selectively communicating with the server to allow the data to be passed between the base station and the terminal.

Preferably, the base station communicates with the server via a link selected from one or a combination of: one or more wireless links; and one or more wire links. More preferably, the base station communicates with the server via one or more wireless links, each of those wireless links being selected from the group comprising: a satellite link; a cellular telephone link; a microwave link; a NATS compatible link; and another communication system. Even more preferably, the selection of the or each link is dependent upon one or more of: the availability of each link; the relative cost of each link; and the relative speed of each link.

Preferably also, the system includes a plurality of spaced apart terrestrial base stations and the server communicates selectively with one or more of the stations. More preferably, the base station with which the server selectively communicates is dependent upon the position of the aircraft with respect to the stations.

In a preferred form, the server communicates with a plurality of remotely disposed computer terminals located on the aircraft for allowing communication of the electronic data between the base station and the respective terminals.

Preferably, the terrestrial base station selectively communicates with an Internet service provider (ISP) or corporate mail server to collect the electronic data and provide it to the terminal via the server.

More preferably, the data is communicated between the server and the terminal using one or more of: SMTP; HTTP; POP3; or IMAP. More preferably, the data is collected from the ISP or corporate mail server and delivered to the base station using POP3 or IMAP.

More preferably, the base station is able to communicate with a corporate mail server that is behind a firewall. The corporate subscriber can provide firewall static user id and password once when signing up for service, arrange for VPN 150 to have secure access behind the corporate firewall, or the corporate subscriber can provide dynamic user id and password information the first time requesting e-mail retrieval.

In a preferred form, the base station includes means for providing a first signal indicative of the structure of the data and the terminal includes means for generating a second signal in response to the first signal confirming that the data is to be transmitted to the terminal. More preferably the first signal is indicative of one or more of the following: text; file type; attachments; graphics; backgrounds; and the like. Even more preferably, the second signal confirms to the base station which portions of the data are to be transmitted.

Preferably, the base station stores electronic data to be transmitted from the base station to the server, and the server stores electronic data to be transmitted from the server to the base station, the server and base station communicating with each other intermittently.

In a preferred form, the server includes a database of information, the database being updated periodically by transmission of electronic data from the base station to the server. More preferably, the server allows the terminals to access the database. Even more preferably, the terminals access the database with a web browser.

Preferably also, the server communicates with that base station which is nearest to the aircraft. More preferably, the server determines which of the base stations is nearest by determining the current location of the aircraft. More preferably, the server communicates with one only of the base stations. Alternatively, the server communicates with selectively with more than one of the base stations, the selection being made on the basis of the available remaining capacity of the respective base stations.

Preferably, the server communicates selectively with one of the base stations, the selection being made on the basis of the least expensive communication route that is made available by the respective base stations.

In a preferred form the computer terminal is suitable for either browsing the Internet or sending and retrieving e-mail. More preferably, the terminal is a portable personal computer. However, it is also preferred that the terminal is a PDA, or a fixed terminal installed as a part of the aircraft, for example as a part of the in-flight entertainment system.

According to a second aspect of the invention there is provided a method for transmitting electronic data between a computer terminal on an aircraft and a terrestrial base station, the method including the steps of:
  providing a server mounted upon or within the aircraft for communicating with the computer terminal wherein the terminal is disposed remotely from the server; and
  selectively communicating between a terrestrial base station and the server to allow the data to be passed between the base station and the terminal.

According to a third aspect of the invention there is provided an aircraft computer communication system including:
  a first port and a second port located on the aircraft for allowing the establishment of a first network node and a second network node respectively; and
  a network located on the aircraft for linking the first node and the second node and allowing communication between the first node and the second node.

Preferably, the network includes a telephone system and the second node is connected to the telephone system. More preferably, the second node is connected to the telephone system with a modem connection. Even more preferably, the first node is connected to the telephone system with a CEPT-E1 connection. In a further preferred form the CEPT-E1 connection complies with an ARINC 746, attachment 11 radio bearer system interface.

Preferably also, the first and the second network nodes are a server and a computer terminal respectively.

According to a fourth aspect of the invention there is provided an aircraft computer network including:
  a network hub located on an aircraft for allowing the transfer of first electronic data from the network to a base station;
  a first port and a second port located on the aircraft for allowing the establishment of a first network node and a second network node respectively, wherein the nodes transfer respective second and third electronic data to the network via the hub such that the first data includes selected portions of the second data.

Preferably, the second data includes selected portions of the third data.

According to an fifth aspect of the invention there is provided a method of communicating between a first node and a second node of an aircraft computer network, the method including the steps of:
  locating a network hub on an aircraft for allowing the transfer of first electronic data from the network to a base station;
  locating a first port and a second port on the aircraft for allowing the establishment of the first network node and the second network node respectively, wherein the nodes transfer respective second and third electronic data to the network via the hub such that the first data includes selected portions of the second data.

Preferably, the second data includes selected portions of the third data.

According to another aspect of the invention there is provided a method of communicating between a first node and a second node of an aircraft computer network, the method including the steps of:
  locating a network hub on an aircraft for allowing the transfer of first electronic data from a base station to the network;
  locating a first port and a second port on the aircraft for allowing the establishment of a first network node and a second network node respectively, wherein the network transfer respective second and third electronic data to the nodes via the hub such that the second data includes selected portions of the first data.

Preferably, the third data includes selected portions of the second data.

In the preferred embodiment each base station is capable to connecting to the Internet, and able to communicate with various Internet service providers and computing resources throughout the world. Thus, rather than each passenger on the aircraft connecting individually via a satellite link, for example, to an Internet service provider, the passengers all connect to a central server on board the aircraft. This airborne server then establishes a connection a base station as necessary. Thus, the efficiency of data transmission between a passenger and their normal ISP may be improved, and the overall cost of transmission to and from the aircraft may be significantly reduced. Further efficiency is gained by using compression software to reduce the quantity of data (bits) that needs to be sent between the airborne server and a base station. A radius client interface is provided by the server/base station to interact with Radius servers for end user authentication and network access requests.

In one configuration, the server and the base station can store and forward requests; for example by a passenger to retrieve e-mail from their ISP/corporate mail server. This may require the passenger's laptop to be connected for the duration of the data exchange between the airborne server and a base station, which can be restricted to 2400 bps or less. Furthermore, there may be no means to restrict or control the flow, for example, of very large attachments.

In another configuration, the server and base station can provide a proxy service, whereby, for example, the base station can retrieve e-mail on behalf of the passenger, including behind a corporate firewall, and transmit this information to the airborne server, and the airborne server can transmit passenger provided e-mail to the base station, in both cases, without the passenger's laptop being connected to the aircraft network. The airborne server collects the e-mail and provides it to the passenger on demand. The aircraft network data rate is not necessarily restricted by the data rate of communications between the airborne server and a base station.

The aircraft network may be comprised of a dedicated cables and circuitry between the server and dedicated ports in the seat. Alternatively, the aircraft network may be wholly comprised within an existing aircraft system, such as the airborne telephone system.

The system of the preferred embodiment thus provides for e-mail transmission and reception, for example, for a larger number of users, each having different Internet Service Providers or corporate e-mail accounts, which may in turn be in different countries.

The protocol used for sending data from the or each remote computer terminal to the server, and from the server to the or each remote computer terminal, is preferably TCP/UDP. Protocols supported by this connection include FTP, SMTP, HyperText Transfer Protocol (HTTP), POP3, IMAP and DNS.

Preferably also, any data to be sent from the base station to the server is first analyzed to determine its structure (unlike store and forward principals). Most preferably, the base station sends to the server structure data indicative of the structure, the structure data being then communicated to a predetermined one of the remote computer terminals. This technique prevents large attachments, for example, to e-mail messages from being sent across the relatively low bandwidth link between the base station and the server, other than where the relevant passenger agrees to pay a nominated fee. That is, upon being informed of the data structure, the user of the remote terminal within the aircraft is provided with the choice as to whether the attachment need be obtained. The passenger can interact with the server through the use of server generated web pages.

Preferably, the base station is arranged to store electronic data to be transmitted from the base station to the server, and the server is arranged to store electronic data to be transmitted from the server to the base station, the server and base station communicating with each other intermittently.

To minimize cost and improve efficiency, the server and base station preferably each store electronic data as they receive it from the individual users on the plane and their Internet service providers/corporate accounts respectively. In one embodiment, a connection is then made intermittently. During each connection, data is exchanged between the server and base station, and after exchange has been completed, the connection is terminated. For example, in one embodiment the server and base station exchange data for one minute or so, every fifteen minutes. Compression software is used to minimize data transfer.

In one preferred form the system includes a plurality of base stations. For example, each Continent may have a separate base station. The server preferably connects with that base station which it is nearest to at a given time. In other embodiments, however, a single base station is utilized.

The server also preferably acts as a virtual WWW. For example, in one embodiment the server stores a plurality of pages of information from a number of web sites. Because this information is stored on board the aircraft, it may be accessed very rapidly and without significant communications expense. The server redirects the passenger browser to appropriate web pages available locally.

The external link, however, allows updating of the stored pages from time to time. Most preferably, the web pages are stored in a cache which is updateable differentially. That is, as changes to a particular web page are effected, only the new or amended parts of each page need be sent via the wireless link, rather than the full page.

Preferably, the server includes a mass storage device which is updated to the latest available content prior to departure of the aircraft from a port of call.

Preferably also, the passenger establishes a PPP connection between the remote computer terminal and the server, normally using a specially provided dialer application. In other embodiments, however, the dialer application is manually configured. Even more preferably, the server captures the passenger user identification and password to be used by a Radius client for user authentication against a Radius server and if applicable a corporate firewall.

The base station preferably receives authentication from a Radius server, delivering e-mail from the passenger and retrieving the passengers e-mail from the passengers Mail server. More preferably, the base station provides the passenger e-mail to the server, with indications of any additional attachments and the base station provides any passenger instant messaging, which will be delivered to the passenger's terminal and displayed using a resident application, such as the dialer. Even more preferably, the server provides the e-mail to the passenger e-mail client with the passenger subsequently retrieves e-mail. Further preferments include interacting the passenger and the server to determine if any additional attachments should be retrieved and, if so, retrieving the attachments from the base station.

Preferably, the passenger browses the world wide web content provided by the server.

In a preferred form, the server/base station use Simple Network Management Protocol (SNMP) for network monitoring.

Preferably also, the server and base station maintain accounting of all transactions for billing purposes. Preferably also, the server and base station monitor passenger activities and recording these activities for other uses. More preferably the server and base station determine when to cease retrieving e-mail on behalf of the passenger and when to delete e-mail messages that have been delivered to the passenger computer terminal within the passenger e-mail mail server if required.

It will be understood that preferred features of this method may correspond to the preferred features of the system of the present invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to."

BRIEF DESCRIPTION OF THE DRAWINGS

Preferred embodiments of the invention will now be described, by way of example only, with reference to the accompanying drawings.

FIG. 7 is a block diagram of an aircraft network according to another aspect of the invention.

FIG. 8 is a block diagram of an alternative aircraft network according to the invention.

FIG. 9 is a block diagram of a further alternative aircraft network according to the invention.

DETAILED DESCRIPTION

Figure 1:
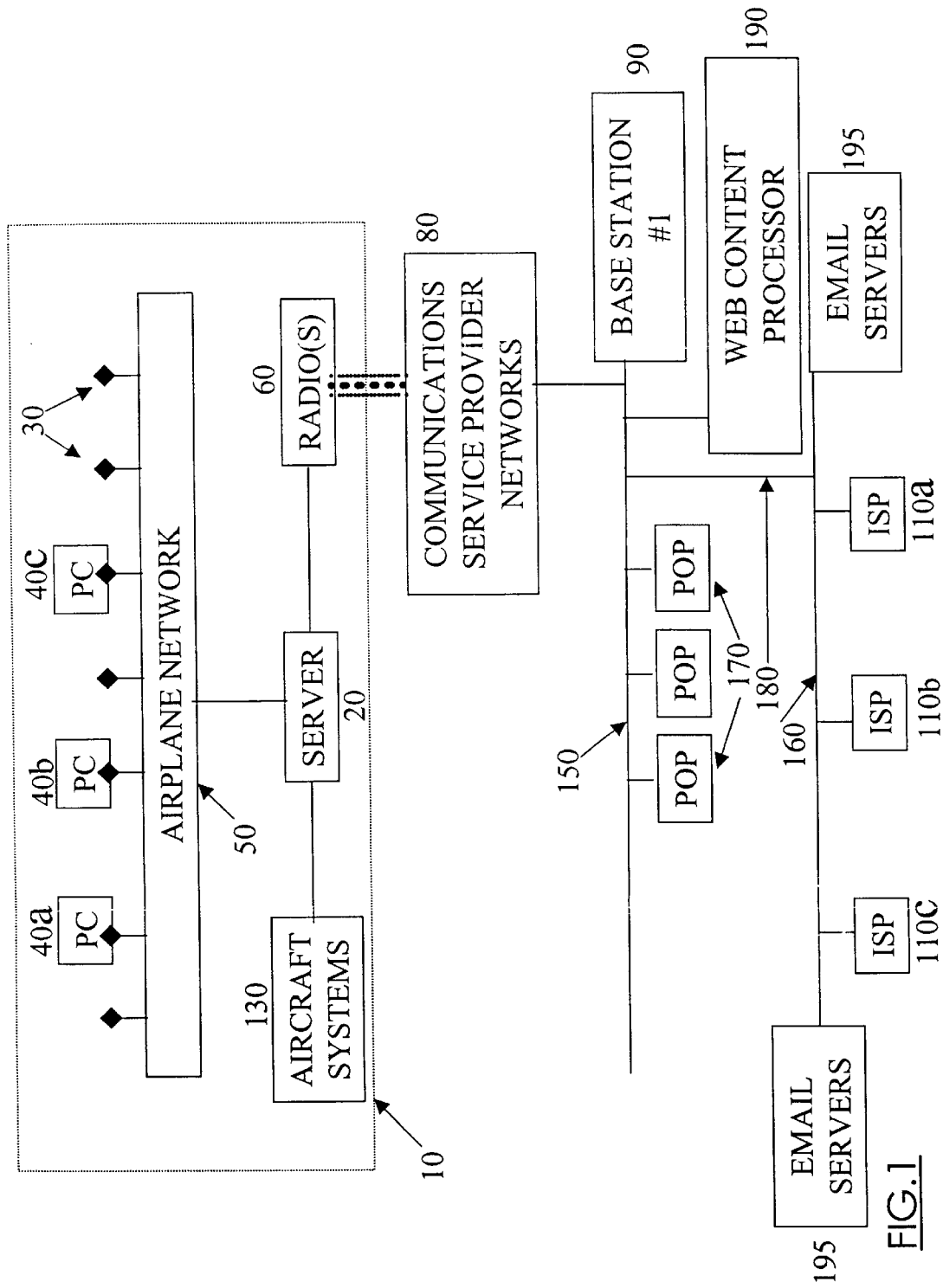
FIG. 1 is a schematic overview of a system according to the present invention.

Referring to FIG. 1, a system for permitting passengers on board an aircraft to send and receive electronic data is shown. Those parts of the system located on board the aircraft are shown within the region bounded by broken lines and labelled 10 in FIG. 1. The components of the system on board the aircraft include a server 20 having a plurality of nodes 30 to which computer terminals 40a, 40b and 40c are attached, as desired. The computer terminals in the embodiment shown are laptop or palm-top personal computers belonging to the various passengers on board. As will be explained below, the server communicates with a wide variety of different terminals running different operating systems. Each computer terminal is connected to the server 20 via an aircraft network 50.

The server 20 has mass storage which contains a database of WWW pages which can be browsed by passengers using their computer terminals 40a, 40b and 40c. Server 20 provides a domain name server (DNS) that masquerades as the passenger's usual DNS. Server 20 then links the passenger to the appropriate locally stored WWW page.

The server 20 also contains storage for e-mail messages.

Connected to the server 20 is one or more radios 60. This permits data to be transferred to base station 90, using communications networks 80.

A virtual private network (VPN) 150 connects base station 90 to communications service provider networks 80, web content processor 190, and via links 180 to the Internet 160. Points of Presence (POP) 170 provide Internet access and e-mail service to subscribers of the service while not on the aircraft. POPs 170 can also be used by communications service provider networks and web content processors as an alternate means to connect to VPN 150.

Base station 90 connects to Internet service provider (ISP) or corporate mail servers 110a, 110b and 110c, which host the mail servers of the respective passengers on board the aircraft who are connected to server 20.

Thus electronic mail sent from terminal 40a on board the aircraft is first forwarded to server 20 where it is stored. The server determines the appropriate time to initiate a data exchange with station 90. This can be when sufficient data is awaiting transmission from server 20, or when the time since the last exchange exceeds a time limit (15 minutes), or when station 90 signals to server 20 via communications service provider network 80 and radio 60. Any e-mail messages stored on server 20 since the previous connection was made are then transmitted to station 90. Station 90 forwards the or each e-mail message on to their eventual destinations Mail servers 195.

In one embodiment, station 90 signals server 20 with a trigger signal which indicates that data in the form of e-mail messages is stored by the station and awaits retrieval. The server then signals the base station to retrieve this data, which is then transmitted to the server.

In a further embodiment, data is transmitted from server 20 to base station 90 at intervals based on predetermined periods of time that the aircraft has been in flight.

Similarly, any messages generated by the user of terminal 40b are also sent to server 20 for storage, and forwarded to station 90 along with the stored messages from the other passengers. The station 90 then forwards messages from the computer terminal 40b on to their eventual destinations as well.

The general procedure for obtaining e-mail messages from the Internet service providers or corporate accounts of the various passengers is similar to the procedure for sending e-mail messages from the various terminals 40a, 40b, 40c on the aircraft. Once a passenger connects a PC to aircraft network 50 and then connects to server 20, the passenger initiates e-mail retrieval. Server 20 accepts the request for e-mail and collects the passenger Mail server address, user id and password. If necessary, a corporate subscriber can activate previously setup firewall services, and provide additional username and password information. This information is passed to base station 90 via radio 60 and communications service provider networks 80. Base station 90 contacts ISPs/corporate servers 110a,b,c and collects any e-mail for the passengers using their user IDs and passwords. Base station 90 continues to collect e-mail from ISPs/corporate servers 110a,b,c for the duration of the flight that the passengers are on. When a connection is established between server 20 on board the aircraft and station 90, that stored e-mail message or messages are transmitted from station 90 to server 20. This procedure is usually simultaneous with the transmission of e-mail messages in the other direction from server 20 to station 90.

Once e-mail messages have been received at server 20, they are retrieved by the respective passenger's computer terminnals, 40a and 40b via the aircraft network 50 when the passenger subsequently connects to server 20 and retrieves mail.

The system includes a single base station. However, in other embodiments, such as that illustrated in FIG. 5, the system includes a number of base stations located at spaced apart locations on the surface of the planet.

Returning to the system of FIG. 1, as the aircraft flies from its departure airport towards the destination airport, aircraft system 130 indicates to server 20 the location of the aircraft at regular intervals.

Figure 2:
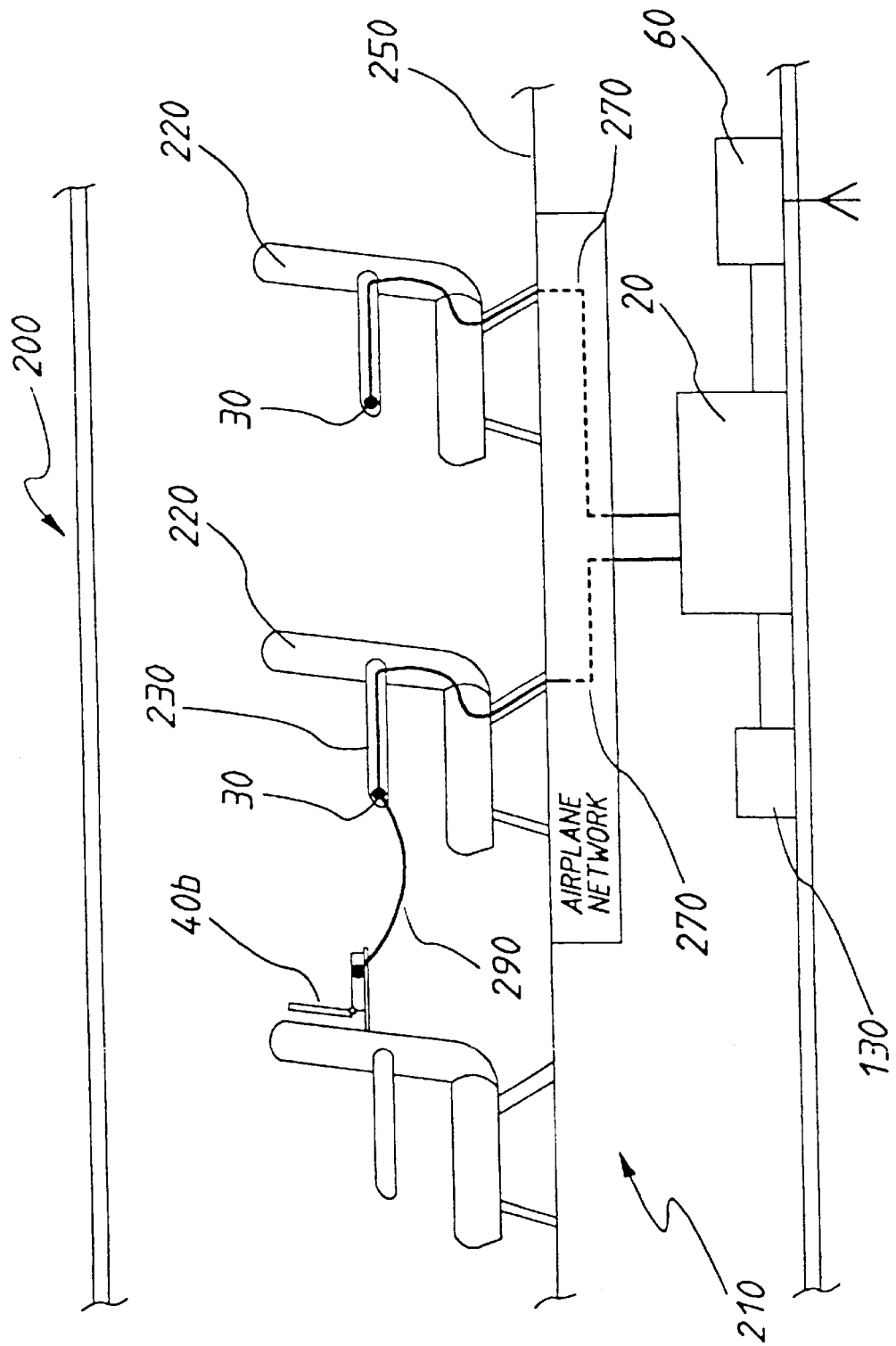
FIG. 2 is a schematic sectional view of a part of an aircraft.
Figure 3:
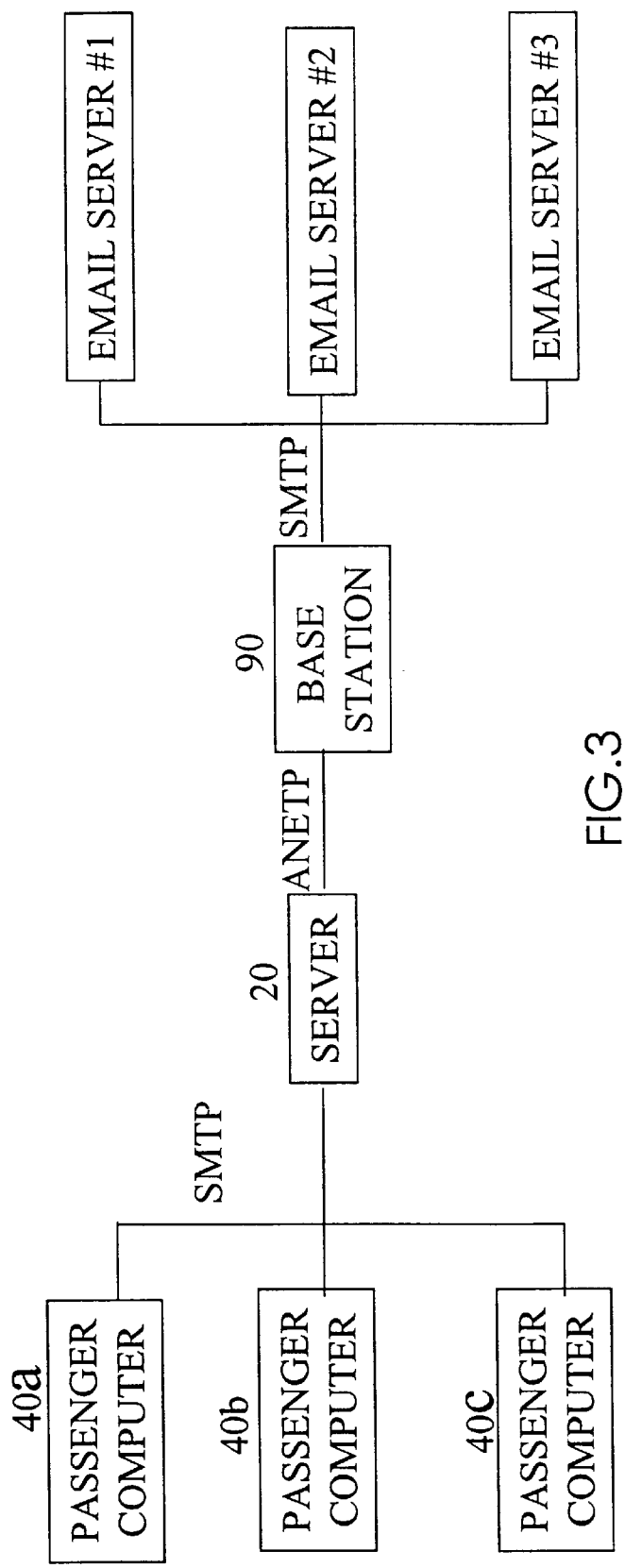
FIG. 3 is a flow diagram illustrating the protocols for transferring e-mail or other data from the aircraft.
Figure 4:
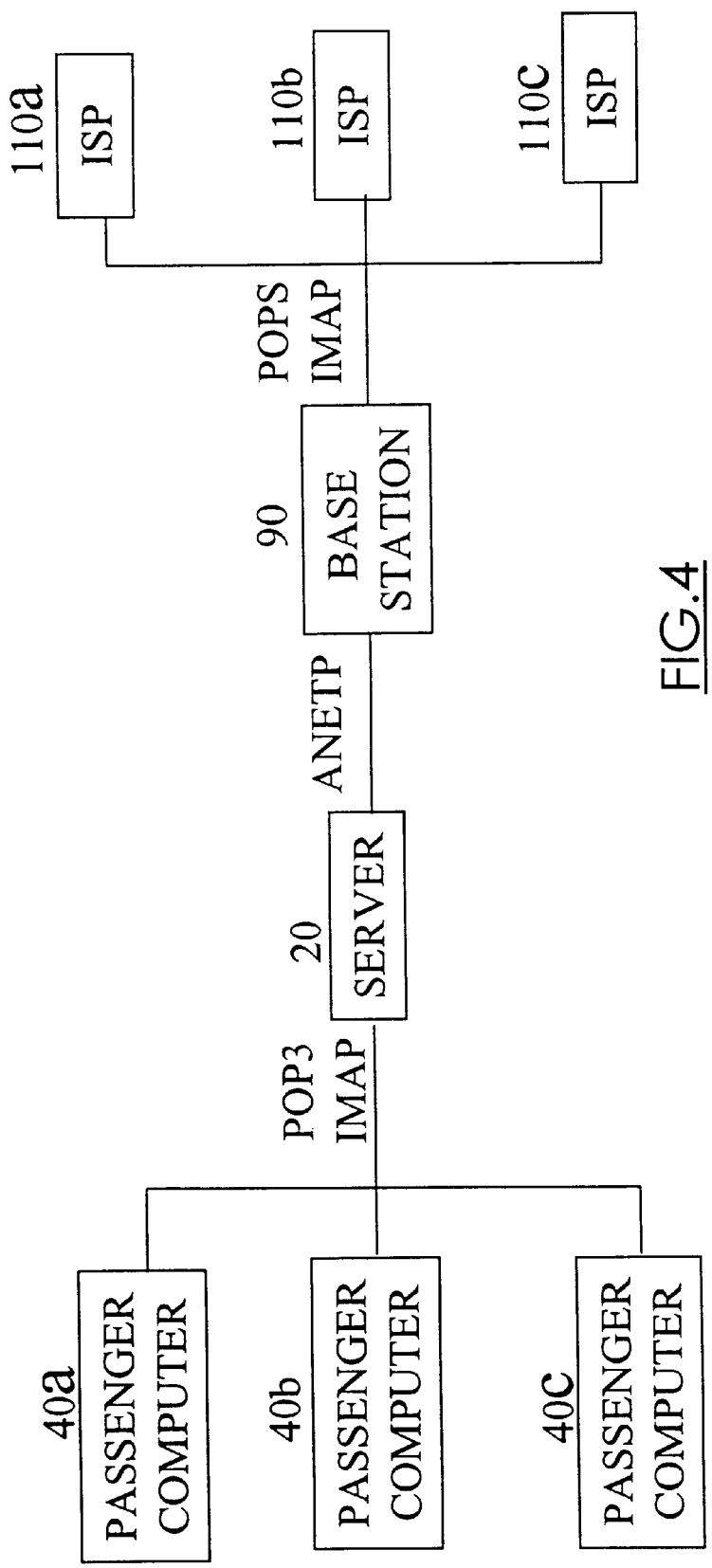
FIG. 4 is a flow diagram illustrating the protocols for transferring e-mail or other data to the aircraft.

Having provided a brief overview of the system, a detailed description of the software and hardware of the system will now be provided with reference to the FIGS. 2, 3 and 4.

Referring to FIG. 2, a section through an aircraft fuselage is shown schematically at 200. Features common to FIGS. 1 and 2 are labelled with like reference numerals.

The part of the system on board the aircraft comprises server 20, mounted within a hold 210 of the aircraft. In other embodiments server 20 is mounted elsewhere within the aircraft. In the specific embodiment described, however, this server is configured to provide proxy Internet services. Such a server is capable of acting both as a server and as an Internet gateway. As described in connection with FIG. 1, the server is connected to the aircraft network 50, to the aircraft systems 130, and is connected to radios 60.

A PPP connection is made between each passenger's portable computer (such as 40b) and server 20. When a passenger wishes to connect to server 20 from his or her portable computer 40b, a cable 290 is used. In one embodiment, one end of cable 290 is inserted into the serial RS-232 port of the portable computer, and the other end thereof is plugged into the socket in the armrest 230. In other embodiments other cabling and connector combinations are utilized, such as connections to the Universal Serial Bus, or the PC modem. In any event, at this point, a hardware connection has been made between the individual portable computer 40b and aircraft network 50.

Preferably, the connection from aircraft network 50 includes the provision of power to the portable computers or other devices so that they need not run on battery power alone. In some embodiments, however, a power supply socket is provided in armrest 230 as well.

The software requirements for connecting to server 20 will now be described. It will be understood that the system is designed to permit access by many different types of portable computer, such as a "laptop" personal computer, a palm-top computer (PDA) running the Microsoft® Windows CE operating system, the Apple® Newton notebook or any other portable device, and the term "remote computer terminal" is to be construed accordingly. It will also be appreciated that this term is also intended to encompass any electronic device which is capable of PPP communication, which may include fixed terminal on the aircraft, for example a part of the in-flight entertainment equipment. The desirability of allowing different platforms to connect to the server is why a PPP connection between the computer and the server is preferred. PPP connections allow Point-to-Point Protocol (PPP) transmissions between the computer and server, PPP not being limited to carrying TCP/IP traffic and being capable of piggy-backing other network protocols such as IPX, SPX and AppleTalk.

Preferably installer software is provided to each user of the system. More preferably the installer software is obtainable from one or more of the following sources: pre-flight access to an Internet site; pre-flight e-mail; floppy disk; or any other suitable means. Typically different installer software will be required for use with different operating systems. In use, the installer software is executed by the passenger either during or prior to the flight. The software adds a new PPP service. The details of how such a PPP service is added will vary between different operating systems, but will be familiar to those skilled in the art. In circumstances where the installer software is provided inflight, the software, once loaded into the passenger's terminal, changes the dial-up networking settings as required and starts the PPP service.

Internet client applications such as HTML browsers and e-mail applications subsequently started by the passenger then obtain Internet services from server 20 over the PPP service.

It will be appreciated that a user could manually carry out the setting up of a new PPP connection, instead of obtaining and running the installer software which automatically does this for the user.

After the passenger disembarks from the aircraft after their flight, the next time they attempt to connect to their ISP/corporate server via a standard Public Switched Telephone Network (PSTN) connection, for example, the relevant network settings are still available on their computer. A dialer program will automatically configure the passenger's computer for local dial-up using a global roaming ISP dial up POP service.

Server 20 is configured to provide proxy Internet services to the passengers' computers. For example, an HTTP request from a passenger's computer for an HTML page is received by server 20, which recovers the requested HTML page, if available, from its cache. The HTML page is sent to the passenger's computer which need not be aware that the page has not been sent directly from the remote WWW site. Similarly, the server 20 responds to IMAP, POP3 or SMTP requests from a passenger's computer as if it were the passenger's normal ISP, by exchanging e-mail from the base station via the server 20. Thus, the proxy configuration of the server 20 means that the passenger's computer appears to be connecting directly to remote Internet services. The passenger informs the server 20 of their e-mail server address, user id, password and firewall details; this information may be automatically downloaded from the passenger's computer to the server the first time the passenger's e-mail system attempts to retrieve mail without any additional or unique action on the part of the passenger.

With the above software and hardware arrangement, a data rate up to the maximun speed of the passengers computer port is possible, with a very large number of separate connections to the server being possible. In practice, of course, there are typically only 300 or so seats on an aircraft, and the server therefore only ever needs a maximum of that many connections. In embodiments making use of modem, serial port, USB and IEEE 1394 the provided data rates are in the order of 56 kbps, 115.2 kbps, 12 Mbps and 400 Mbps respectively.

Furthermore, whilst the hardware and software connections between the server and the passenger's computer have been described in terms of PPP connections, it will be understood that Ethernet connections are equally possible. Nonetheless, having understood the function of the software operating on the passenger's computer, the skilled person will have no difficulty in implementing a similar program for Ethernet connection between that computer and the server. In particular, the system registry settings of a passenger's computer will need to be changed for the duration of the flight to reflect the fact that the passenger's computer is to be connected to a DNS gateway different to that which the passenger would normally use, as well as the use of a server defined IP address. The settings can be adjusted automatically by the software, and then automatically reset when the flight terminates and the passenger shuts down his computer.

In addition to acting as an SMTP/POP3/IMAP gateway for sending and receiving e-mail messages to and from a passenger's mail server on the ground, the server additionally acts as a local WWW site. In particular, the server includes a large cache which contains mirrors of a variety of WWW sites. These are loaded into the cache either by remote connection, to be described below, or by physically replacing the cache whilst the aircraft is at an airport.

For the preferred server described above, a cache containing a multitude of WWW pages can be stored, in addition to audio and video data, to replicate a virtual world wide web environment. Differential Management of Proxy Cache (DMPC) may be used. This allows very large collections of WWW pages to be updated and deleted on the basis of the changes to the code (HTML) within each page, without having to reload all of each page when updating the cache. When the cache is first loaded, DMPC also allows a predetermined number of levels, such as three, within a particular web site to be downloaded to the cache automatically. However, in other embodiments a different number of levels are downloaded. Where three layers are stored each separate site mirror stored in the cache on the server contains the "home page," the first layer of pages referred to in the home page, and the second layer of pages referred to in the first layer of pages.

DMPC, or other processes, also removes any HTML code from the WWW sites downloaded into the cache, where that code would otherwise attempt to generate a hyperlink to a site that does not exist on the cache. Thus, there is no possibility for a passenger browsing the pages within the cache on board the aircraft to visit Internet sites which have not been stored in the cache.

Although the passenger's computer is therefore only accessing a "virtual" worldwide web, consisting of the pages of information stored in the cache, the server provides the information in a standard WWW form. Thus, each passenger can use their normal web "browser" to access the information stored in the cache as if they were accessing the original web site itself. As an option, the cache may also contain a search engine to allow those pages of interest to a passenger to be located.

In one preferred embodiment, the server provides a search engine that references the URL of any pages contained on the server. In the event that the exact page is not found the search engine will conduct additional searching of the other URLs to determine whether there are any that appear similar in meaning to that one requested. Once obtained, the results of the search are provided to the passenger for viewing. Results of searches that are not matched may be used for updating the cache.

As previously mentioned, the cache can be updated in two different ways. The quickest method is for the cache to be updated directly from a cache drive which is brought on board the aircraft. At major airports, a Terrestrial Control Unit or TCU will be available for updating web-site content on a server. At any particular time, a TCU will contain updated web content for the sites that are contained on the server. When a aircraft arrives at a particular airport, updating the web cache simply involves transferring the updated information from the TCU to the server on an aircraft via an appropriate medium. The server is switched on and a physical connection is made between the cache drive containing the data for updating and the cache within the server. Preferably, the updating takes place via DMPC. The physical connection can include physical replacement of the cache, connection to a data loader, or via a direct connection to an airport LAN.

An alternative method of updating the cache is from the TCU closest to the arrival airport. In this embodiment this is achieved by updating from the TCU via a wireless local area network (LAN) once the aircraft has landed. Some airports now have LANs which allow connection via wireless link such as "Gatelink" and high speed LAN link cable. Thus, as the aircraft arrives at the airport, the server can be configured to connect via this link to the airport LAN. Once a connection between the server on board the aircraft and the LAN hub has been established, the latter can connect in turn to the closest TCU to obtain updates for the cache within the server on board the aircraft. As with the method of updating using a cache drive, the cache is updated using DMPC to minimize updating time.

In some cases the links are other than those specified above and the server is configured to utilize these links, as required.

Another alternative, although more limited in application, is to update the cache during flight.

The connection between server 20 and station 90 is best illustrated in FIG. 1 and will now be described in more detail. As passengers upon the aircraft compose and send e-mail messages, those messages are passed to server 20 which stores them in a dedicated region of the cache. Simultaneously, e-mail messages sent from outside the aircraft and intended for passengers on board that aircraft accrue in a memory within the station 90.

The transmission is carried between the server and the base station using standard protocols (TCP/IP/PPP) or on a protocol known as ANETP. This protocol has been developed to address the perceived problems with wireless (satellite) connections between the server on board the aircraft, and a base station. The data is transferred in a compressed form using blocks, between two systems that are linked via data connection.

Server 20 controls the connection to the station 90. At, for example 15-minute intervals, the server connects to the base station. The server provides the station 90 with a session ID and the number of blocks it is about to transfer together with the size size of these blocks. Simultaneously, the station 90 confirms with server 20 the number and size of blocks to be transferred. The block size determined by server 20 may be overruled by the base station, which determines the speed and reliability of the link.

Once confirmation is given, server 20 transfers block #1 to the station 90. If this transfer is successful the base station responds with an OK signal. This process continues until all blocks have been sent, or the connection fails or times out. This same process takes place for sending data from the base station to the server, in one embodiment, simultaneously in both directions.

If the data stream is broken, the server restores the connection from the next block after the last block successfully acknowledged as received was sent.

Further details of the ANETP protocol may be found in Appendix 1.

The INMARSAT telecommunications satellite is used in some embodiments for transferring data. However, this only transfers analog signals at 2,400 bits per second. However, low and medium earth orbit communication satellites have recently been launched, such as those offered by Globalstar and Iridium. These satellites increase the available bandwidth for the server to base station link.

The communications link remains active until the server has delivered each of the messages waiting to station 90, and station 90 has also delivered each of its stored e-mail messages to server 20. When the server detects that the data transfers are complete, it terminates the communications session with the base station. From that point, any e-mail messages received at server 20 from the passengers' computers are stored in the cache of server 20 until the next connection to the base station is made. Similarly, e-mail messages at station 90 are stored there until the next connection.

Although communications have been described as being connected intermittently, it will be appreciated that other communications, specifically packet communications, which enable the server 20 and station 90 to communicate without any additional delay.

In addition to transferring e-mail message data, the communications links (when connected) also transfers web site updates during the flight. Because of the relatively low bandwidth of the existing communications links, large scale updating of web pages stored in the cache on server 20 is not practical. Small amounts of information, perhaps relating to share prices, weather updates and news flashes can be provided with a minimal amount of data being transmitted. Thus, each time, a connection is made to exchange e-mail messages, such updates can also be exchanged. The ANETP protocol used for transferring data between the server and a base station may dynamically assign the bandwidth available during each connection.

Station 90 is arranged to connect to the mail servers of the various passengers on board the aircraft. Typically, a normal Internet connection 180 from network 150, as will be familiar to those skilled in the art, is used. Certain mail servers, however, allow only dial-up connections, and in that case it is preferable to employ the Secure Socket Layer (SSL) protocol to allow authentication of a base station by the mail server. Mail sent to the passengers on board the aircraft will, of course, initially be sent to the mailbox at the passenger's ISP/corporate mail server. The system described above fetches the mail from the mailbox at the passenger's mail server and forwards it to the passenger's computer on the aircraft via station 90 and server 20. The system uses the provided firewall information to gain access to mail servers located behind a firewall. Likewise, messages sent from the aircraft will travel first to the base station, before proceeding on to their destination. In that case, there is no need for the e-mail messages to be routed via the passenger's ISP/corporate mail server. As will be explained in further detail in FIG. 3 below, the SMTP protocol is used for forwarding e-mail messages from a base station and it is this protocol which will decide the route to the eventual destination.

As also shown in FIG. 1, station 90 connects via VPN 150 to web content processor 190 for the purposes of updating the cache in server 20. Once the updated pages are stored at station 90, they are either be transferred via communications network 80.

In another embodiment of the invention more than one base station is used for the intelligent management of e-mail information between an aircraft and the Internet. Each base station is identical in specification and also the information they hold. This enables the aircraft to connect to any base station and find the pertinent information for the aircraft ready for retrieval. Each base station has connections to VPN 50, providing a means for receiving connections from any airborne server, communicate with other base stations/web content processors, and links to the Internet for retrieving/sending customers' information.

The method by which e-mail messages are sent from passenger's computers on the aircraft to their destination, and the method of receipt of e-mail messages by the passengers' computers on the aircraft from their respective ISP/corporate mail servers, will now be described with reference to FIGS. 3 and 4.

There is a very high bandwidth connection possible between each passenger's computer and server 20, and a potentially high bandwidth between station 90 and its eventual destination or passenger mail server. However, the bandwidth of the connection between server 20 and station 90 is typically an order of magnitude or more slower. The well-known SMTP protocol was developed for slow but permanent connections between machines on networks. The connection between server 20 and station 90 is, in contrast, both slow and non-permanent. An important feature of the system is that the connection time is relatively short, to minimize communications costs. During a short connection time, it is important to recognize that the negotiation or handshaking protocols and so forth will take up a relatively large percentage of the total connection time.

Server 20 receives e-mail messages from each passenger's computer 40a, 40b and 40c. In FIG. 3, the SMTP protocol only is shown. This is used because any computer with a browser will handle this protocol. However, it will be understood that other protocols such as HTTP are suitable depending upon the system requirements, as will be familiar to those skilled in the art.

Messages in Internet mail format are stored in server 20. When a connection is made between server 20 and station 90, the e-mail messages are sent via a protocol which addresses the low bandwidth and short communication time of the satellite connection. Specifically, the protocol (ANETP) which carries the Internet e-mail messages includes a number of compression systems to allow for greater bandwidth and management of dropouts during the time in which server 20 is connected to station 90. For example, depending upon the size of files to be transferred, negotiations are carried out. Once station 90 has received the e-mail messages, it forwards them on to the various destinations using SMTP. The manner in which the information is passed from the base station to the various destinations is entirely standard and will be familiar to those skilled in the art.

Referring now to FIG. 4, the method by which e-mail messages are received from a passenger's ISP/corporate mail server to his or her computer on board the aircraft is shown.

POP3 and IMAP are Internet standards for transferring mail from mailboxes at customer mail server to that customer's computer. The details of the these protocols will be well known to those skilled in the art, and further details may be found in the RFCs. While POP3 is acceptable for passing the messages to base station 90, it has several limitations which mean that its use is not preferred for transfer of information between a base station and the server. Specifically, POP3 does not allow message descriptions, and attachments to e-mail messages (such as graphic images and the like) are simply sent as encrypted, uncompressed text messages. The attachments can therefore be extremely large and even on a standard dial-up connection between a computer and an ISP, with a transfer speed of 28.8 kbits per second, data transfer can take several minutes. Thus, a separate protocol (ANETP) is used for transferring mail between the base station and server 20. A method called Intelligent Mail Management (IMM) is used to manage the collection and delivery of e-mails including the management of any attachments to the e-mails. The IMM protocol analyses e-mail messages to identify the various components of the message. For example, if an e-mail includes a text message and two attachments, the first having a size of 4 Mb and the second having a size of 6 Mb, these components are identified to server 20. It may be, of course, impractical to send these very large attachments via the slow communications links. Thus, the IMM method simply sends a summary of the e-mail received at the base station from the passenger's mail server to the server on board the aircraft, together with the text part of the message. Once this has been received by server 20, it is forwarded to the specified passenger, again using either the HTTP protocol, the POP3 protocol or any other suitable protocol.

When a passenger receives an e-mail message using this system, he or she receives the text message and an indication of any attachments to the original e-mail message. These attachments are only sent to the passenger on board the aircraft upon the passenger agreeing to pay a nominated fee. In one embodiment, the passenger interacts with server 20 by utilizing a hyperlink in the received message leading to a private interactive web page hosted by server 20, providing an on-line means for the passenger to control the delivery of attachments. Alternatively, the passenger can defer delivery of large attachments until the passenger has left the aircraft and established an alternative connection to the relevant ISP/corporate mail server.

A potential problem arises when a passenger logs onto server 20, thus triggering the system to collect any waiting e-mail messages from his mailbox at the ISP/corporate mail server, but does not retrieve some messages subsequently collected by base station 90 and stored in server 20 before leaving the flight. Copies of e-mail retrieved by base station 90 may be retained at the originating mail server; they are not necessarily deleted when retrieved by base station 90. After the flight, the passenger will connect to the originating mail server through whatever means and these messages may still available for download. Some mail clients will detect those messages that have been already received and will automatically delete the duplicates from the originating mail server without necessarily downloading them. In one embodiment, e-mail that is not delivered to the passenger is resent to or retained by base station 90 and then subsequently resent to the passenger's e-mail account as a new Internet e-mail message. Base station 90 can format the resent message to appear virtually identical to the original message without regard to mail server capabilities. In a preferred embodiment, server 20 informs base station 90 which messages have been delivered to terminals 40*a*, 40B and 40C, and base station 90 then contacts ISP/corporate 110*a*, 110*b* and 110*c* mail servers and deletes those messages confirmed to have been delivered from the appropriate mail servers.

Server 20 and base station 90 coordinate the registration of passengers such that e-mail is retrieved optimally for the duration of a flight. By monitoring aircraft system parameters such as passenger doors open/closed and whether the aircraft is airborne or on the ground, server 20 determines the appropriate time for base station 90 to cease retrieval of e-mail for that set of passengers on that particular flight. Base station 90 incorporates additional monitors to recover from the loss of communications with a particular server 20. Server 20 can detect unusual events, such as cancelling a flight without leaving the gate, return to gate without taking off, and holding short of the destination gate for extended periods of time, and provide the optimum level of service for the particular situation. For example, e-mail retrieval from base station 90 may cease when the doors open at the destination gate, while server 20 is obliged to provide any e-mail already retrieved from base station 90 to a passenger's laptop for as long a period of time that is practical, for example 20 minutes after doors open.

The operating system of the preferred server also continually monitors all of the primary services provided by the server. If errors occur then the system automatically re-boots. However, remote diagnosis of faults on the server is also possible using the communications link with the base station 90. SNMP is used for network monitoring.

The aircraft network 50 provides additional advantages. Passengers may communicate with one another using the network, or with airline crew to request assistance, for example. The server, in some embodiments is also configured to provide audio and video images to the passengers. Currently, some aircraft provide a screen (in the back of the seat in front of the passenger), and audio sockets in that passenger's armrest. A relatively small selection of audio and/or video programs are selectable by the passenger. Using the present system, provided that a passenger has a portable computer with audio/video capabilities, that is, a sound card and MPEG driver, then a very large quantity of audio/video entertainment can be provided. The very high data transfer rate possible on board the aircraft, when data does not have to be received from the ground, and the large amount of storage space on the server, permits, for example, MPEG movies to be viewed or games to be played.

Figure 5:
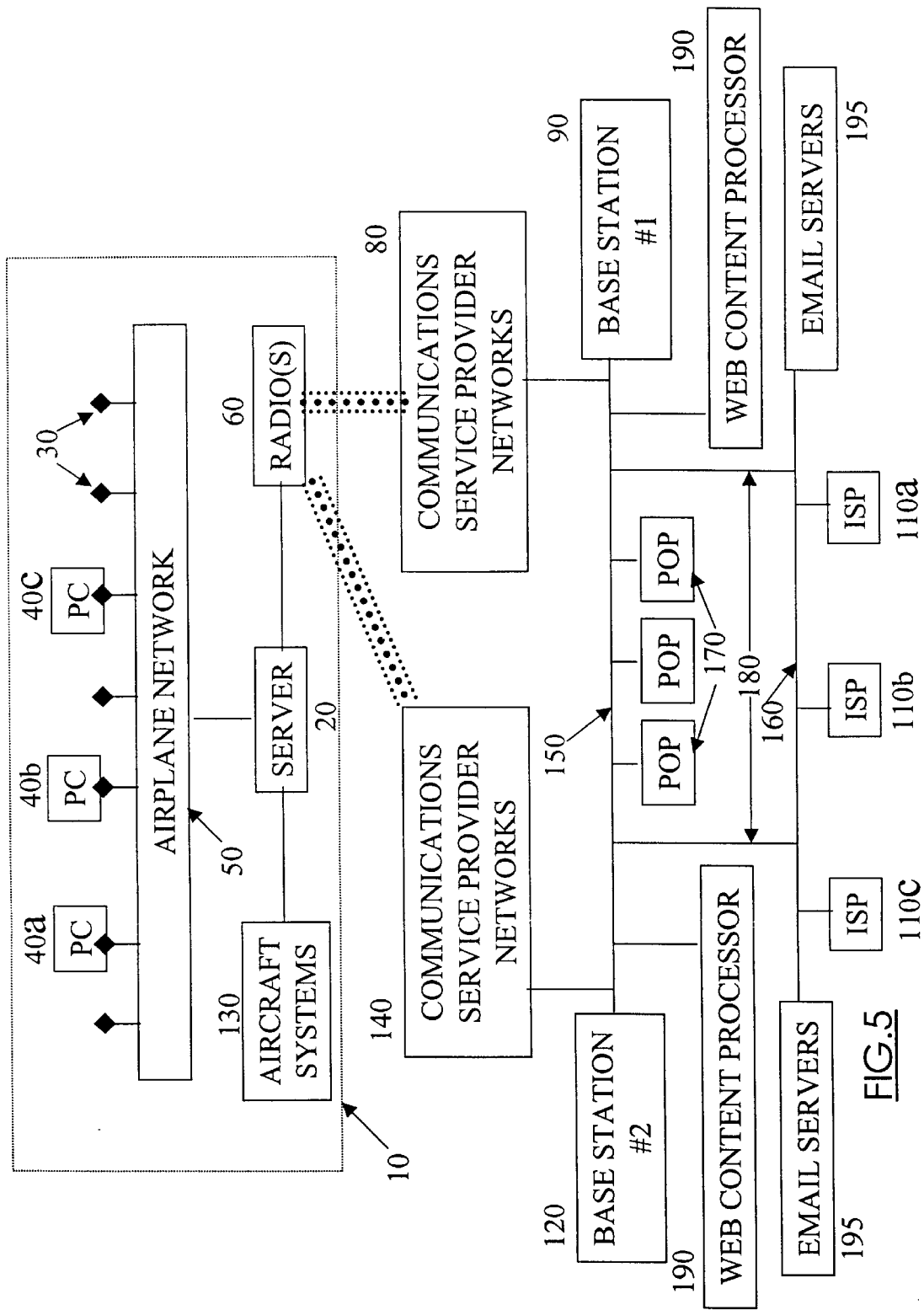
FIG. 5 is a schematic view of an alternative system according to the invention.
Figure 6:
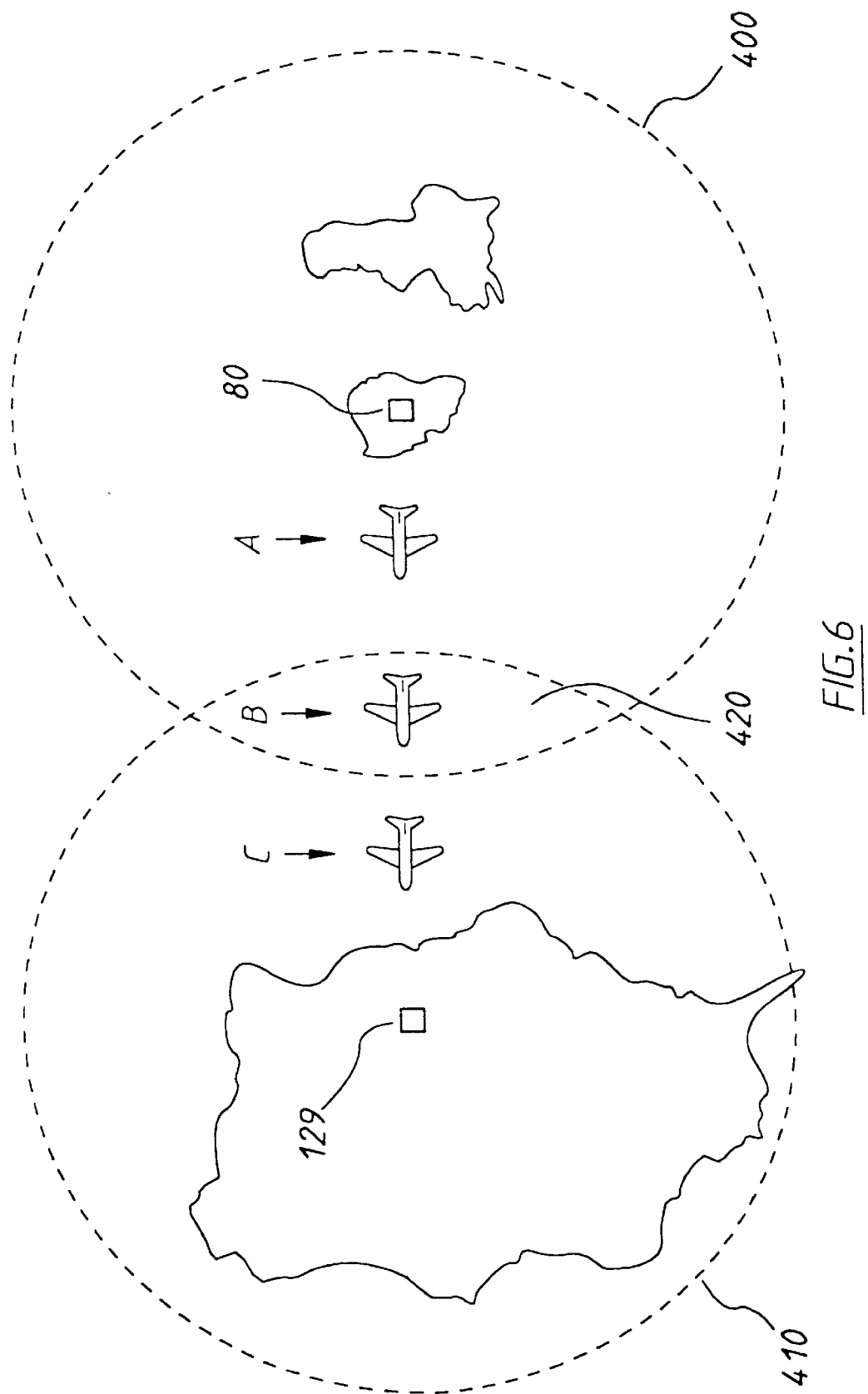
FIG. 6 is a schematic representation of the interaction of an aircraft and the terrestrial part of the system of FIG. 5 as it travels from a point of departure to a destination.

Another embodiment of the invention is illustrated in FIG. 5 and FIG. 6. More particularly, in this embodiment, use is made of a plurality of like spaced apart base stations. For ease of illustration only a second base station 120 is shown. It will be appreciated, however, that in this embodiment three such stations are used. In other embodiments more than three base stations are used.

Rather than communicating with any one of the base stations, server 20 communicates with that base station to which it is closest to at the time. The technique by which the aircraft connects to a base station, and in particular how hand-over between a first base station 90 and a second base station 120 takes place, will now be described in more detail with reference to FIG. 5 and FIG. 6. The planet is divided up into regions 400, 410 with a region of overlap 420 between them. FIG. 4 only shows two such base stations 90, 120 and their respective cells 400, 410. However, in practice, a number of base stations will be provided around the planet at suitable locations. For example, base stations may be provided in Western Europe, North America, South America, South East Asia, Southern Africa and Australia. The size of each cell will, of course, depend upon the total number of base stations provided, so that the main airline routes are covered. In one preferred embodiment of the invention only three base stations are utilized, one in the UK, one in the USA and one in Australia.

An aircraft flying from London to New York will connect over the initial part of its flight to the first base station 90 located, for example, in the Republic of Ireland. Station 90 is used when the aircraft is stationary at the point of embarkation. While the aircraft is being cleaned and refueled, the wireless connection to the airport LAN is made, or the cache drive is supplied, to update the cache within server 20. Once the aircraft leaves the airport in London, all communications are made via communications service provider networks 80 to base station 90. At position A shown in FIG. 6, for example, the aircraft is still within the first cell 400 and communicates solely with station 90. The aircraft is able to track its own position using aircraft system 130. Each time the aircraft connects to station 90, in addition to exchanging data carrying e-mail messages and cache updates, it also informs station 90 of its position.

Each base station is pre-programmed with its coverage area. Thus, when the aircraft enters the transition area between two cells, station 90 commands server 20 to contact station 120 for subsequent serves upon the completion of the next data exchange with server 20. Station 90 then contacts station 120 via VPN 150 and provides the necessary information for station 120 to continue to provide service.

The aircraft initiates communications and continues to communicate with station 120, which now carries out the various functions previously carried by station 90, such as downloading information from various Internet sites so that the cache in server 20 can be updated, and connecting to the passenger's mail server to retrieve e-mail messages. The second base station preferably provides different information to the first base station. For example, when the cache is updated during the flight, news, weather and so forth for the geographical area surrounding station 120 is provided instead. Passengers travelling from London to New York can accordingly receive both up-to-date and relevant information throughout the flight.

Under some circumstances, it is possible server 20 will inadvertently contact the wrong base station. While server 20 should retain necessary information in non volatile memory to recover gracefully from a reset condition, all base stations will respond to server 20 with the necessary information to contact the correct base station, using VPN 150. In one embodiment, certain passenger configuration information is retained at the base station to enable server 20 to recover from a reset condition without interrupting service or necessitating all passengers re-register for service.

Aircraft network 50 provides a set of connection points 30 that provide a means to communicate between server 20 and each passenger terminal 40a, 40b, 40c. A typical terminal may have one or more of the following interfaces available:

1. Modem
2. RS232 Serial Port
3. Universal Serial Bus (USB)
4. IEEE 1394
5. Ethernet Port The aircraft network may support one or more of the above interfaces. Exemplary characteristics for such networks are described below with reference to FIGS. 7, 8 and 9. More particularly, FIG. 7 illustrates a modem network interface that allows the passenger to connect their modem to a telephone mounted such that access is available from their seat. In many cases, only one phone is available for each three passengers. It is typical that a dedicated phone is available to passengers flying in premium seats.

Airborne telephone networks generally follow the guidance of ARINC 746, "Cabin Communications Systems," and ARINC 628, "Cabin Equipment Interfaces."

A Cabin Telecommunications Unit (CTU) 65 provides a telephone switching capability between the Cabin Distribution System (CDS) 67 (which provides the telephones in the cabin) and the radios 60 that provide air ground telephone service. The interface from the CDS 67 to the CTU 65 is described in ARINC 746, attachment 17, although many configurations are not completely compliant with this definition. The interface from the CTU 65 to the air ground radios 60 is described in ARINC 746, attachment 11. Most CTUs and radios comply with this specification, and are interchangeable.

Network 50 provides an interface to the CTU 65 such that server 20 appears to be an air ground radio to the CTU 65. The CTU 65 routes calls to server 20 in a manner identical to the way the CTU 65 routes telephone calls to the other air ground radios 60.

The handset 30 generally provides an RJ11 jack to provide a two wire interface to the passenger modem. The passenger configures their PPP dial up networking to call a special phone number allocated for this service. The passenger connects their terminal 40a to the telephone handset 30 and initiates the telephone call. The CTU 65 routes this call request to server 20 based on the phone number that is being dialed by the passenger terminal 40a (and does not route the call to the air ground radios 60).

The server 20 terminates each call request into an internal modem bank. This allows the passenger modem and the server modem to communicate at data rates as high as 56 kbps using an existing cabin telephone system, given minimal configuration changes to the CTU.

An alternative interface is an RS232 port, which is illustrated in FIG. 8. Such an interface is available on many passenger terminals and can provide data rates as high as 115 kbps. Accordingly, the aircraft network 50 shown in FIG. 8 provides a jack 30 which allows the passenger to connect their RS232 port from their seat. The jack 30 is connected to a dedicated Cabin Distribution Network 69, which provides a communications path to server 20. The passenger terminal 40a is configured to utilize the serial port and establishes a PPP connection with server 20.

Some passenger terminals will support a USB connection, with data rates as high 12 Mbps. The aircraft network 50 shown in FIG. 8 provides a jack 30, which allows the passenger to connect their USB port from their seat. The jack 30 is connected to a dedicated Cabin Distribution Network 69, which provides a communications path to server 20. The passenger terminal 40a is configured to utilize the USB port and establishes a PPP connection with server 20.

Some passenger terminals will support an IEEE 1394 connection, with data rates as high 400 Mbps. The aircraft network 50 shown in FIG. 8 provides a jack 30, which allows the passenger to connect their IEEE 1394 port from their seat. The jack 30 is connected to a dedicated Cabin Distribution Network 69, which provides a communications path to server 20. The passenger terminal 40a is configured to utilize the IEEE 1394 port and establishes a PPP connection with server 20.

Some passenger terminals will support an Ethernet interface, with data rates as high as 100 Mbps. The passenger terminal can be connected to the aircraft network as shown in FIG. 9. Typically, the interface uses an RJ45 jack connected into an Ethernet Hub. The Hub(s) provide IP networking services between the passenger terminal 40a and the server 20. This aircraft network is well known to one familiar in the art. In one embodiment, a router is provided between the passenger terminal Ethernet port and the Ethernet Hub to allow use of a passenger terminal 40a fixed IP address and the server 20 assigned IP address.

The various protocols referred to in this specification, unless otherwise indicated, are all industry standards. Full details of these standards may be obtained from various sources as will be known by those skilled in the art.

Preferred embodiments of the invention offer many and varied advantages and improvements over the prior art systems. By way of example, at least the following advantages are achieved:

1. A plurality of users are cost effectively bundled together for communication with a single ground station;
2. e-mail being sent to the user during the flight is stored on the onboard server notwithstanding that the actual user is not logged onto that server at the time including users whose mail servers are behind a corporate firewall
3. Use can be made of any ISP/corporate mail server and any communication protocol;
4. An e-mail message to the user will include a hypertext link for any attachments. Should the user wish to access the attachments they will be linked to a private web page which allows retrieval of that attachment;
5. The homepages on the onboard server will masquerade as the actual homepages;
6. Differential updating of onboard web pages; and
7. The user's e-mail name and password are captured and utilized such that the user does not have to have these re-entered during the establishment of the intermittent communication between the base station and the onboard server.

Although the invention has been described with reference to a specific example it will be appreciated by those skilled in the art that it may be embodied in many other forms.

Appendix 1

Airnet Enhanced Transfer Protocol (ANETP/1.0)

This appendix is designed as the preliminary specifications for the TCP/IP based protocol standard ANETP.

Abstract

This document describes ANETP, a protocol for sending, and receiving data via slow and inconsistent PPP links.

1. Rationale and Scope

The development of the Internet as the preferred communications device for the modern world has been a lengthy process and its growth has been a geometric acceleration linked strongly to the increasing reliance on computing systems for business and personal use.

The major problem is that the systems designed to carry Internet signalling have an inherit terrestrial dependence.

ANETP is like a bridge over which today's systems can travel until such time as they are replaced with a better system such as IPv6 http://www.cis.ohio-state.edu/htbin/rfc/rfc2373.html. It is a proprietary standard and at this stage it is not designed to be a widely implemented standard.

1.1. Definitions

The HOST machine is on board the aircraft.

The REMOTE machine is the ground.

All connections are invoked from an aircraft (in the sky) to ground, initially. (HOST to REMOTE).

As TCP/IP is the recognized leader in Internet and Heterogeneous networks alike, and since PPP is the preferred analogue (serial) connection for TCP/IP and the intended environment for ANETP is such an environment, it is logical that we use TCP/IP as the underlying transport layer. It is a prerequisite for ANETP that both ends of any ANETP connection are TCP/IP ready, and a PPP link has been established.

2. ANETP Protocol

The ANETP protocol is built on top of TCP/IP. Once a PPP connection has been established, Initial Protocol negotiation can begin. Once a transaction cycle has been completed, the cycle will begin again without a disconnect cycle, in a ping pong manner, unlike all other protocols.

It is assumed that the client and server will always swap at the end of a transaction. In addition the transaction cycle is not a static server client relationship. A connection, although invoked by the HOST, can be overridden by the REMOTE. In fact, unlike traditional HOST connect/HOST disconnect command hierarchy, the REMOTE machine is the overriding system in all connections.

2.1 Code Response Library

200–300 Status OK

300–400 Status OK (size of previous transaction)

500–600 ERROR Status

600–700 ERROR Status (size of previous transaction)

2.1.2 Examples

200 Welcome

300 Block

400 Send 1 ID

500 Data path interrupted

600 Incomplete 1 (520)

700 Received

2.2 ANETP Initial Negotiation

2.2.2 The Header

The HOST machine connects to the REMOTE machine and responds with a header. The header is designed to allow for quick identification of REMOTE machines, time/date, ID and version of ANETP. For example, 200 Welcome to ANETP/1.0 ID:#### SEQ:#### Tue, 3 Feb. 1998 12:14:01+1100^Version^ServerID^Trans Seq.^Date^GMT

2.2.3 The Response

The Remote machine will respond with either a 300 response or an overriding 200. The 200 override may continue with a 200 and counter 200 until the REMOTE has issued the same 200 set twice.

A 300 response is used to set the block size and number of blocks.

A 200 response reverses the direction of the connection, and the cycle starts as at 2.2.2. For example:

300 Block 1024 Blocks 19 Total 19100 SEQ

SEQ is as above

2.2.4 The Counter

A counter response of a 300 code can be used to override the block size but not the transaction total. This may continue with a 300 and counter 300 until the REMOTE has issued the same 300 set twice. This allows for the ground system to override any block settings. For example, 300 Block 512 Blocks 34 Total 19100 SEQ If the 300 is identical then data transaction begins next.

3. Send Data

3.1 Start Cycle

The data cycle begins with a 400, e.g.

400 Send BLOCK SEQ SIZE REMAINING

^Block #^Block size in bytes

^SEQ TRansaction ID

^Blocks remaining.

NO OVERRIDE IS POSSIBLE at this stage.

3.2 Data

Data is sent as a zipped binary data stream.

3.3 Response

700 Received BLOCK SEQ SIZE

^Block #^Block size in bytes

^SEQ TRansaction ID.

3.4 Timeout or Disconnect

In the event that data is incomplete or times out the HOST machine will force a PPP reconnect. The cycle will recommence from the block that was last fully sent/received.

300 Block 1024 Blocks 19 Total 19100 SEQ

The initial 300 is the same for even a partial session, however

BLOCKS and BLOCK size may be altered to allow for connection improvements.

400 Send BLOCK SEQ SIZE REMAINING

^Block #^Block size in bytes

^SEQ TRansaction ID.

^Blocks remaining.

BLOCK number is the block number that was dropped. Thus the session continues from where it left off.

Disconnect

A permanent disconnect occurs when three 200s are sent in a row such an escape sequence indicates that neither HOST or REMOTE wishes to send data.

What is claimed is:

1. A method for transmitting electronic data between a plurality of passenger computer terminals on an aircraft and a terrestrial base station, the method comprising:

automatically changing access settings of at least some of the plurality of passenger computer terminals for accessing and exchanging e-mail, and automatically returning the access settings to a prior condition afterwards;

collecting and storing a plurality of e-mail messages for the plurality of passenger computer terminals at the base station;

establishing an intermittent wireless link with the base station; and transmitting the plurality of e-mail messages as a group over the link between an airborne database and the base station.

2. A method according to claim 1 wherein the establishing includes establishing one or more wireless links, the wireless links being a satellite link, a cellular telephone link, a microwave link, or a NATS compatible link.

3. A method according to claim 1 wherein establishing includes identifying a desired link from a plurality of links based on the availability of each link, the relative cost of each link, or the relative speed of each link.

4. A method according to claim 1 wherein transmitting includes transmitting data using SMTP, HTTP, POP3 or IMAP protocol.

5. A method according to claim 1 wherein establishing includes identifying a desired base station from a plurality of base stations based on a available remaining capacity of the base stations or a least expensive communication route available by the base stations.

6. A method according to claim 1, further comprising receiving a trigger signal indicating e-mail messages stored at the base station await retrieval.

7. The method of claim 1 wherein storing includes storing store e-mail messages transmitted to the aircraft over the wireless link for at least one of the plurality of passengers, despite the one passenger's computer terminal not being logged on.

8. The method of claim 1, further comprises dynamically assigning IP addresses to at least some of the plurality of passenger computer terminals for accessing and exchanging e-mail over an Ethernet network, wherein the at least some passenger computer terminals have static IP addresses and wherein Ethernet network properties of the at least some passenger computer terminals remain unchanged.

9. The method of claim 1, further comprising monitoring system parameters of the aircraft including passenger doors open/closed status, aircraft airborne/landed status, flight cancellation, or extended aircraft waiting while away from a gate, and communicating with the base station for e-mail message transfer based on the system parameters of the aircraft.

10. The method of claim 1, further comprising automatically collecting from each passenger and transmitting to the base station, mail server addresses, user id's and passwords and firewall access information from the plurality of passenger computer terminals when each passenger attempts to retrieve e-mail.

11. The method of claim 1, further comprising automatically collecting from each passenger e-mail from a mail server logically positioned behind a firewall security measure, without the need for the passenger computer terminal being available.

12. The method of claim 1, further comprising storing a predetermined number of levels for a plurality of web pages, and updating changes in web page code for the plurality of web pages without reloading each web page.

13. A system for transmitting electronic data between a terrestrial base station and a plurality of passenger computer terminals coupled to a network on an aircraft, the system comprising:

a database for storing e-mail messages for the plurality of passenger computer terminals; and a server secured to the aircraft and coupled to the database and to the plurality of passenger computer terminals via the network, wherein the server and database are configured to collect and store a plurality of e-mail messages from the plurality of passenger computer terminals and configured to establish an intermittent wireless link with the base station to transmit the plurality of e-mail messages as a group over the link to the base station when the aircraft is in flight and when the server determines to initiate the transmission, wherein the server provides installer software for selective loading to the plurality of passenger computer terminals, wherein the installer software automatically changes access settings of at least some of the plurality of passenger computer terminals for accessing and exchanging e-mail with the server over the network, and automatically returns the access settings to a prior condition afterwards.

14. The system of claim 13 wherein the server and database store e-mail messages transmitted to the aircraft over the wireless link for at least one of the plurality of passengers, despite the one passenger's computer terminal not being logged into the server over the network.

15. The system of claim 13 wherein the server is configured to employ Intelligent Mail Management (IMM) and to communicate with the plurality of passenger computer terminals under a Point-To-Point (PPP) protocol.

16. The system of claim 13 wherein the server is configured to compress the plurality of e-mail messages before transmission over the wireless link.

17. The system of claim 13 wherein the server is configured to receive from the base station a trigger signal when a predetermined amount of data has been stored by the base station, and in response thereto, to initiate receiving the stored data from the base station.

18. The system of claim 13 wherein the server is configured to monitor a status of a scheduled flight of the aircraft including a beginning and end of the flight, if the flight is cancelled, or if the flight is held away from a gate for an extended period of time, and wherein the server is configured to communicate with the base station for e-mail message transfer based on the flight status of the aircraft.

19. The system of claim 13 wherein the server provides a domain name server and automatically receives, and transmits to the base station, mail server addresses, user id's and passwords, including applicable firewall access information, from the plurality of passenger computer terminals when each passenger attempts to retrieve e-mail.

20. The system of claim 13 wherein the server database includes a plurality of web pages, and wherein the server provides a domain name server and automatically redirects passenger DNS requests to appropriate web pages.

21. The system of claim 13 wherein the database includes a plurality of web pages, and wherein the server provides a domain name server that records passenger requested URLs and provides requested URLs to the base station for updating the plurality of web pages in the database.

22. The system of claim 13 wherein the server is configured to permit communications between the plurality of passenger computer terminals aboard the aircraft via the network.

23. The system of claim 13, further comprising a plurality of passenger computer terminals secured to the aircraft and coupled to the network.

24. The system of claim 13 wherein the database includes a plurality of video games, compressed format movies or audio files, and wherein the server and database provide the video games, movies or audio files to a plurality of passengers aboard the aircraft via the network.

25. The system of claim 13 wherein the database includes a plurality of web pages, wherein the plurality of web pages lack links to other web pages not stored in the database, and wherein the server and database provide search engine functions to permit the plurality of passenger computer terminals to search and access desired web pages in the plurality of web pages.

26. The system of claim 13 wherein the database includes a plurality of web pages, and wherein the server and database load and update the plurality of web pages under differential management proxy cache operations to load a predetermined number of levels from selected web sites, and to update changes in web page code without reloading each web page.

27. The system of claim 13 wherein the database includes a plurality of web pages, and wherein the server and database update predetermined data in the plurality of web pages via the wireless link, wherein the predetermined data includes share prices, weather updates or news flashes.

28. The system of claim 13 wherein the database includes a plurality of web pages, and wherein web pages in the database are updated by connection with a data loader at the base station, by physical replacement of a mass storage device containing the database, remotely by a wired link, or remotely by the wireless link.

29. The system of claim 13 wherein the base station selectively communicates with an Internet service provider (ISP) or corporate private network to collect data and provide it to the passenger computer terminals via the server.

30. The system of claim 13 wherein the server notifies the base station of pending e-mail messages not received by a computer terminal aboard the aircraft, wherein the computer terminal has an e-mail address, and wherein the base station is configured to store and resend, to the e-mail address, the pending e-mail messages after the aircraft arrives at a destination.

31. The system of claim 13 wherein the server notifies the base station of e-mail messages, from a mail server, that have been received by the computer terminal aboard the aircraft, wherein the computer terminal has an e-mail address, and wherein the base station is configured to contact the mail server for deletion of the e-mail messages that have been received by the computer terminal.

32. A system for transmitting electronic data between a terrestrial base station and a plurality of passenger computer terminals coupled to a network on an aircraft, the system comprising:
   a database for storing e-mail messages for the plurality of passenger computer terminals; and
   a server secured to the aircraft and coupled to the database and to the plurality of passenger computer terminals via the network, wherein the server and database are configured to collect and store a plurality of e-mail messages from the plurality of passenger computer terminals and configured to establish an intermittent wireless link with the base station to transmit the plurality of e-mail messages as a group over the link to the base station when the aircraft is in flight and when the server determines to initiate the transmission, wherein the terminal receives from the base station a first signal indicative of a type of attachment associated with an e-mail message, and wherein the terminal is configured to transmit to the base station a second signal in response to the first signal requesting that the attachment be transmitted from the base station to the server over the wireless link.

33. A system for transmitting electronic data between a terrestrial base station and a plurality of passenger computer terminals coupled to a network on an aircraft, the system comprising:
   a database for storing e-mail messages for the plurality of passenger computer terminals; and
   a server secured to the aircraft and coupled to the database and to the plurality of passenger computer terminals via the network, wherein the server and database are configured to collect and store a plurality of e-mail messages from the plurality of passenger computer terminals and configured to establish an intermittent wireless link with the base station to transmit the plurality of e-mail messages as a group over the link to the base station when the aircraft is in flight and when the server determines to initiate the transmission, wherein the server is configured to monitor system parameters of the aircraft including passenger doors open/closed status and aircraft airborne/landed status, and to communicate with the base station for e-mail message transfer based on the system parameters of the aircraft.

34. The system of claim 33 wherein the server determines when to transmit the plurality of e-mail messages based on the amount of time the aircraft has been in flight or an amount of data stored.

35. The system of claim 33 wherein the base station stores electronic data to be transmitted from the base station to the server, and the server stores electronic data to be transmitted from the server to the base station, wherein the server and base station communicate with each other intermittently, and wherein the server determines when to transmit the stored data on the basis of the amount of time the aircraft has been in flight or on the basis of an amount of data stored.

36. The system of claim 33 wherein the base station is configured to generate a trigger signal between the base station and the server when a predetermined amount of data has been stored by the base station, to initiate transmitting of the stored data to the server.

37. A system for transmitting electronic data between a terrestrial base station and a plurality of passenger computer terminals coupled to a network on an aircraft, the system comprising:
   a database for storing e-mail messages for the plurality of passenger computer terminals; and
   a server secured to the aircraft and coupled to the database and to the plurality of passenger computer terminals via the network, wherein the server and database are configured to collect and store a plurality of e-mail messages from the plurality of passenger computer terminals and configured to establish an intermittent wireless link with the base station to transmit the plurality of e-mail messages as a group over the link to the base station when the aircraft is in flight and when the server determines to initiate the transmission, wherein the server receives from the base station a summary of an attachment associated with an e-mail message and provides a hypertext link for accessing the attachment by a passenger, and wherein the server is configured to receive the attachment over the wireless link if the passenger provides a payment signal.

38. A system for transmitting electronic data between a terrestrial base station and a plurality of passenger computer terminals coupled to a network on an aircraft, the system comprising:
   a database for storing e-mail messages for the plurality of passenger computer terminals; and
   a server secured to the aircraft and coupled to the database and to the plurality of passenger computer terminals via the network, wherein the server and database are configured to collect and store a plurality of e-mail messages from the plurality of passenger computer terminals and configured to establish an intermittent wireless link with the base station to transmit the plurality of e-mail messages as a group over the link to the base station when the aircraft is in flight and when the server determines to initiate the transmission, wherein the server receives from the base station a summary of an attachment and a hypertext link for sending the attachment by a passenger, and wherein the server is configured to send the attachment over the wireless link to the base station if the passenger provides an authorization signal.

39. A method for transmitting electronic data between a plurality of passenger computer terminals on an aircraft and a terrestrial base station, the method comprising:

collecting and storing a plurality of e-mail messages for the plurality of passenger computer terminals at the base station;

establishing an intermittent wireless link with the base station;

transmitting the plurality of e-mail messages as a group over the link between an airborne database and the base station; and providing a summary of an attachment associated with an e-mail message and a hypertext link for accessing the attachment, and receiving the attachment over the wireless link if a passenger provides a payment signal.

40. The method of claim 39 wherein the base station transmits at least one of the plurality of e-mail messages to a destination mail server for at least one of the plurality of passengers, despite the one passenger's computer terminal not being logged on.

41. The method of claim 39, further comprises dynamically assigning IP addresses to at least some of the plurality of passenger computer terminals for accessing and exchanging e-mail over an Ethernet network.

42. The method of claim 39, further comprising automatically collecting from each passenger e-mail from a mail server logically positioned behind a firewall security measure.

43. A system for transmitting electronic data between a terrestrial base station and a plurality of passenger computer terminals coupled to a network on an aircraft, the system comprising:

a database for storing e-mail messages for the plurality of passenger computer terminals; and a server secured to the aircraft and coupled to the database and to the plurality of passenger computer terminals via the network, wherein the server and database are configured to collect and store a plurality of e-mail messages from the plurality of passenger computer terminals and configured to establish an intermittent wireless link with the base station to transmit the plurality of e-mail messages as a group over the link to the base station when the aircraft is in flight and when the server determines to initiate the transmission wherein the terminal receives from the base station a first signal indicative of whether the data is text, a selected file type, an attachment, or a graphic image, and wherein the terminal is configured to generate a second signal in response to the first signal confirming that the data is to be transmitted from the base station to the terminal.

* * * * *